United States Patent [19]
Carroll et al.

[11] Patent Number: 5,055,202
[45] Date of Patent: Oct. 8, 1991

[54] METHOD AND APPARATUS FOR MAINTAINING PREDETERMINED CYCLONE SEPARATION EFFICIENCY

[75] Inventors: Noel Carroll, Sassafras, Australia; Robert W. Carroll, Bradbury, Calif.; Charles M. Kalnins, Malvern, Australia

[73] Assignee: Conoco Specialty Products Inc., Houston, Tex.

[21] Appl. No.: 381,686

[22] PCT Filed: Nov. 16, 1988

[86] PCT No.: PCT/AU88/00443
§ 371 Date: Sep. 15, 1989
§ 102(e) Date: Sep. 15, 1989

[87] PCT Pub. No.: WO89/04725
PCT Pub. Date: Jun. 1, 1989

[30] Foreign Application Priority Data
Nov. 19, 1987 [AU] Australia ............... PI5522/87

[51] Int. Cl.$^5$ ............................................. B01D 17/038
[52] U.S. Cl. .................... 210/739; 210/96.1; 210/143; 210/512.1; 210/787; 210/805; 73/61.1 R; 137/88
[58] Field of Search ............... 210/96.1, 512.1, 512.2, 210/739, 745, 787, 788, 805, 104, 194, 512.3, 101, 105, 143; 209/211; 55/338, 459.1; 73/61.1 R, 861.04; 494/901; 364/502; 137/88

[56] References Cited

U.S. PATENT DOCUMENTS

| | | | |
|---|---|---|---|
| 3,653,842 | 4/1972 | Putman | 364/502 |
| 3,735,869 | 5/1973 | Carpenter et al. | 209/211 |
| 4,090,523 | 5/1978 | Kelley et al. | 210/105 |
| 4,138,332 | 2/1979 | Schloffel | 210/101 |
| 4,237,006 | 12/1980 | Colman et al. | 210/788 |
| 4,428,839 | 1/1984 | Davies et al. | 210/512.3 |
| 4,581,134 | 4/1986 | Richter | 210/101 |
| 4,622,150 | 11/1986 | Carroll | 210/739 |
| 4,629,555 | 12/1986 | Colman et al. | 209/211 |
| 4,659,461 | 4/1987 | Carroll | 210/512.2 |
| 4,698,152 | 10/1987 | Carroll | 210/512.2 |
| 4,773,257 | 9/1988 | Aslesen et al. | 73/61.1 R |
| 4,815,536 | 3/1989 | Prendergast et al. | 73/61.1 R |

OTHER PUBLICATIONS
International Patent Publication, WO86/03696, Carroll, Jul. 3, 1986.

Primary Examiner—Robert A. Dawson
Assistant Examiner—Joseph Drodge
Attorney, Agent, or Firm—John E. Holder

[57] ABSTRACT

For separating an oil and water mixture, the mixture is applied to the inlet of a cyclone separator so that the oil emerges from an overflow outlet and the water from an underflow outlet. Sensors measure the purity of the separated water and oil components and under control of a suitable control device, additions are made to the inlet liquid of quantities of oil or water to alter the ratio of oil and water quantities in the inlet mixture in a fashion tending to maintain separation efficiency. The oil and water to be admixed are taken from reservoirs.

24 Claims, 1 Drawing Sheet

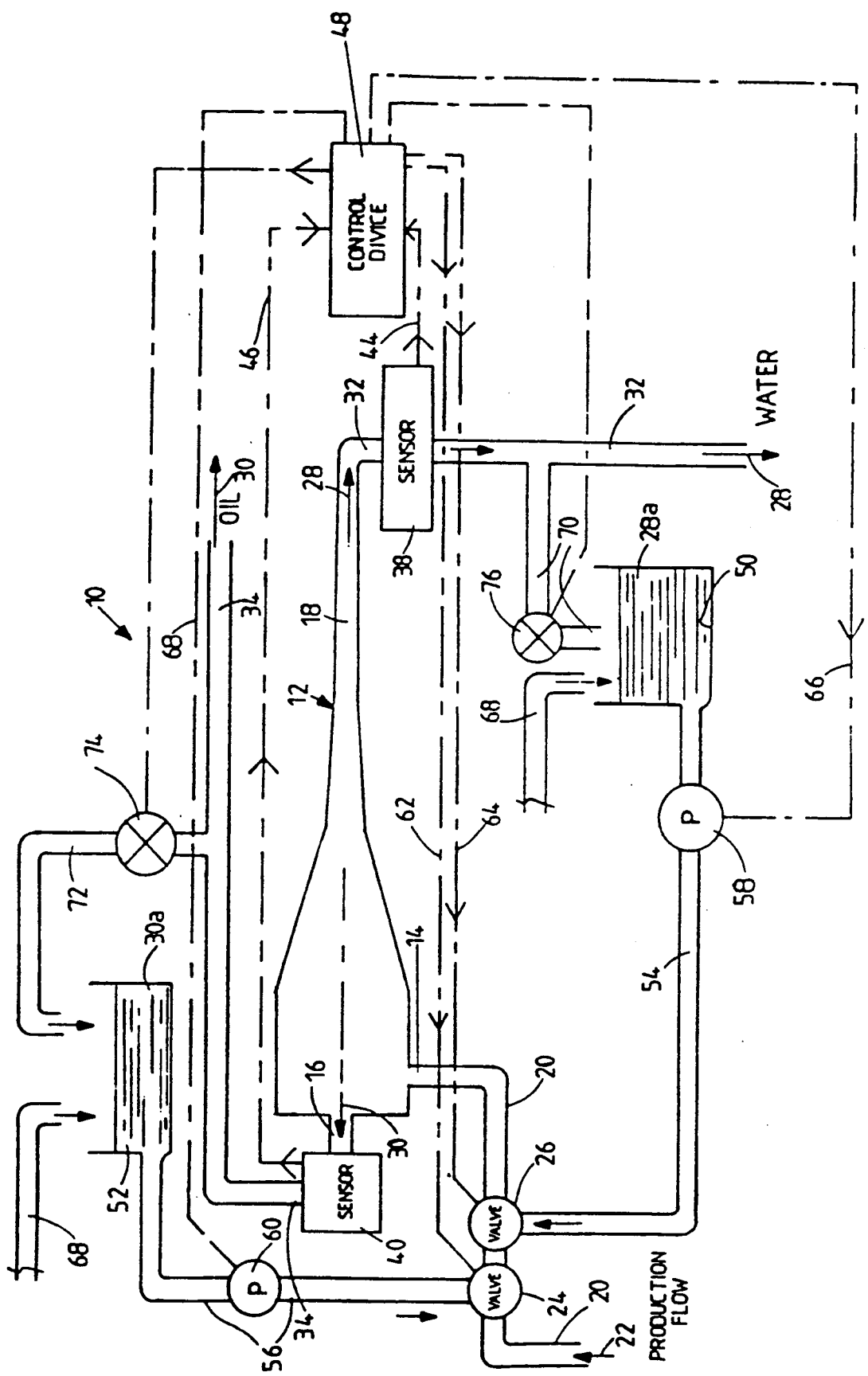

METHOD AND APPARATUS FOR MAINTAINING PREDETERMINED CYCLONE SEPARATION EFFICIENCY

This invention relates to a method of and apparatus for separating phases of a multi-phase liquid.

Particularly, but not exclusively, the invention concerns separation of a water component from an oil-water mixture such as the production liquid from an oil well head. Characteristically, such liquid contains substantial quantities of gas and water in admixture with oil components and as a first step in the production process it is usual to undertake a separation process which has as its object to remove substantial quantities of the gas and water so as to obtain an output liquid in which the oil at least predominates and at least the water component is reduced to a relatively small fraction.

Conventionally, the above described separation is effected in a separation tank in which the water component settles to the bottom of the tank, from which it can be readily drawn off. Such tanks are, however, bulky, heavy and generally inconvenient of use, particularly in circumstances, such as on off-shore oil platforms, where space and weight constraints are important factors.

It has been proposed to use cyclone separators for separating oil and water components from a mixture thereof, and such separators are coming into increasing use because of the considerable efficiency they can possess and the generally smaller and lighter separating facilities which can be constructed using them. Principally, however this use is confined to separating processes further removed from the initial separating process above described. In that regard, the water component, once removed by the initial separating process, will contain some residual oil, typically a few percent, and it is in the separation of this residual oil that cyclone separators have thus far found principal application.

The failure of the cyclone separator to thus far become widely used for the initial separation of water from production liquid, notwithstanding the advantages to be attained from such use, arises because it has not been found possible to design cyclone separators which can effectively operate on the production liquid. In part, this is because it appears generally more difficult to design effective separators for dealing with high oil concentrations ("dewatering" separators) than it is to design separators for dealing with high concentrations of water ("de-oiling" separators). In part too, the problem appears to arise because of the greater variation in composition of the production flow liquid as compared to the relatively lesser variation in composition of the liquid upon which deoiling separators usually operate. De-oiling separators typically operate on a liquid which is predominately water with a few percent oil and they are effective to reduce the oil content to a few tens of parts per million. On the other hand, dewatering separators may be called on to separate an oil/water mixture having a water content varying between 20 to 70%. At least adaptions of designs suitable for deoiling applications can be made effective for mixtures with water contents at the lower end of the last-mentioned range, but these may not always be effective for handling water contents at the upper end of this range.

An object of the present invention is to provide separating apparatus, and a method of separating, utilizing cyclone separators and which permits the aforementioned problem to be at least partly ameliorated.

In one aspect, the invention provides a method of separating components from a liquid mixture by use of a cyclone separator comprising the step of adding to said mixture a quantity of at least one said component whereby to improve the efficiency of separation.

In another aspect the invention comprises a method of separating components from a liquid mixture by use of a cyclone separator, comprising determining the efficiency of separation of at least a first of the components from the mixture and upon determination that the efficiency has departed from a predetermined efficiency adding to the incoming mixture to the separator a quantity of one of said components to tend to cause said efficiency to be reverted to said predetermined value.

The invention also provides, in a further aspect, separating apparatus comprising a cyclone separator having inlet means for a liquid to be separated and at least two outlets for outlet of respective components of said mixture, which components differ in density, said apparatus further including supply means for supply of a quantity of one of said components and means for selectively mixing an amount of said one component from said supply means to said mixture prior to admission to the separator. The apparatus may include control means adapted to effect admixture of said one component to the mixture in a fashion tending to maintain constant the separating efficiency of at least a first of the components comprising the mixture.

The apparatus may include sensing means positioned to be subjected to the flow of said first separated component, for sensing the purity thereof, and the control means being responsive to the sensing means to vary the quantity of admixed said one component.

The method and apparatus of the invention may also be adapted to effect additions of a selected one of more than one of the components or to effect addition of different components. Similarly the control means may be responsive to purity sensors positioned to sense the purity of more than the first said separated component.

The invention is further described, by way of example only, with reference to the accompanying drawing, the single FIGURE of which is a schematic representation of a separating apparatus constructed in accordance with the invention.

The separating apparatus 10 shown comprises a cyclone separator 12 having an inlet 14, for inflow of a multi-component liquid to be separated, an overflow outlet 16, for outflow of a lighter component of the inlet liquid, and an underflow outlet 18 for outflow of a heavier component of the inlet liquid. In this case, the inlet liquid is shown as comprising production liquid 22 from an oil well (not shown). This liquid is conveyed via a duct 20, having two mixing valves 24, 26 therein to the separator inlet 14. If necessary, a pump may be included in the duct 20 to bring the pressure and volume flow of the inlet liquid to values suitable for the operation of the separator 12.

The separator may be designed along similar lines to the deoiling separators described in U.S. Pat. Nos. 4,237,006, 4,576,724 and in International application PCT/AU85/00010, for example, although some modifications may be desirable in order to take account of the fact that it may be desirable to optimise the separator for operation on inlet liquids having somewhat higher oil concentrations than these separators are generally optimised for. Particularly, the overflow outlet 16 may require considerable increase insofar as the cross-sectional area thereof is concerned.

The separator 12 operates in conventional fashion, the liquid 22 being admitted tangentially into an elongate tapered separating chamber in such a fashion as to direct the denser water component 28 out the axially positioned underflow outlet 18 and to direct the less dense oil component 30 out the axially positioned overflow outlet 16. As shown, the outlets 16, 18 are at opposite ends of the separating chamber, the outlet 18 being at the smaller diameter end of the separating chamber and the outlet 16 being at the larger diameter end, towards which end the inlet 14 is likewise positioned.

The separated water from separator 12 is directed from the apparatus 10 via a duct 32, such as for further processing. The separated oil from the separator is directed from the apparatus 10 via a duct 34, likewise for further processing. In practice, gas and other lighter components may likewise be passed in admixture with the oil from outlet 16 to duct 34. Some at least of these other components may be separated by interposition of further separators or other equipment in duct 34, but whether or not such further separators or other equipment are included is not important for the purposes of the present invention.

Ducts 32, 34 include therein respective contaminant sensors 38, 40. Sensor 38 acts to measure the relative degree of contamination of the water flowing in duct 32 by oil, whilst sensor 40 acts to measure the relative degree of contamination of the oil flowing in duct 34 by water. Suitable sensors may operate to measure contamination by measurement of the optical density of the liquids as flowing in the ducts 32, 34 or as flowing through suitable diverter ducts.

Electrical outputs of the sensors 38, 40 indicative of the relevant contaminant levels, are passed on lines 44, 46 respectively to a control device 48.

The apparatus further includes reservoirs 50, 52 which respectively contain quantities of water 28a and oil 30a. These reservoirs 50, 52 communicate with mixing valves 24, 26 via respective further ducts 54, 56. These ducts include respective pumps 58, 60. The valves 24, 26 and pumps 58, 60 are electrically controllable under influence of signals from control device 48 delivered thereto on respective lines 62, 64, 66, 68.

In operation, under conditions where the sensors 40, 38 provide control device 48 signals indicative an increase in contamination of either the oil 30 exiting the separator 12 via outlet 16 or of the water 28 exiting via outlet 18, the control device 48 is effective to operate either pump 60 and valve 24 or pump 58 and valve 26 to pump liquid from the respective reservoir 52, 50 to be mixed via the respective mixing valve 24, 26 with the incoming liquid to the separator, in duct 20.

This control may be effected as desired in accordance with any suitable regime, for example in the instance where the purity of oil emerging from the separator is of primary concern, and it is known that separating efficiency loss, insofar as the outgoing oil purity is concerned, is due to increase in the quantity of oil in the incoming liquid above a predetermined level, the control device 48 may simply be responsive to output from sensor 40 to operate valve 26 and pump 58 whereby to increase the proportion of water in the incoming liquid until such time as the oil outflow contaminant level drops. In such case, the valve 24 and pump 60 may be omitted, or the control device 48 may operate valve 24 and pump 60 only as a secondary control when required. Such additional control may however be required (or may be provided alone) if the characteristics of the separator 12 are such that separating efficiency drops off with low water concentrations in the incoming liquid. In this case, too, it may be desirable to provide a suitable sensor in duct 20 effective to provide an output indicative of the oil/water ratio in the incoming liquid, the control device in that case being responsive to that output to facilitate determination by the control device as to whether addition of oil or addition of water is required to optimise operation. In other embodiments, the sensors 38 and 40 are omitted, the control device operating in accordance with sensed oil/water ratios in the incoming liquid in duct 20 to maintain the oil/water ratio within a desired range, by addition of water or oil to the incoming liquid, as required.

The reservoirs may be maintained topped up by inlet from external water and oil sources, via the inlet ducts 66, 68 shown. Alternatively, as shown, bleed ducts 70, 72 may be provided communicating with oil duct 34 and water duct 32, respectively, these including respective valves 74, 76 which are controlled as necessary by control device 48 to bleed oil and water from the ducts 34, 32 via the bleed ducts 72, 70 to the respective reservoirs 52, 50.

The invention also has application otherwise than for optimising operational efficiency of separator 12 as referenced to varying inlet oil/water concentrations. For example, the separation of production liquid into oil and water components is rendered less efficient where the liquid contains grit or like particles. However, the separation efficiency may in that case be improved by admixture of oil to increase the oil concentration in the incoming liquid. In another aspect, the invention therefore further provides a method of separating components from a liquid mixture by use of a cyclone separator comprising the step of determining the presence of grit or like particles in said mixture and adding to said mixture a quantity of at least one of said components or determining such presence. The invention also provides apparatus for carrying out this method.

Furthermore, the teachings of the invention are especially applicable to separating techniques for separating liquid mixtures having a dispersed phase and a continuous phase where the addition effected to the mixture to be separated is of a liquid which is the same as or similar to that one of the liquids in the mixture which comprises the dispersed phase. Thus, for oil-water mixtures where oil is the dispersed phase, oil is added, whereas for oil-water mixtures where water is the dispersed phase, water is added.

More generally, the invention also contemplates addition of other materials, such as surfactants or the like, responsive to determination of inlet or outlet conditions in a cyclone separator.

The described construction has been advanced merely by way of explanation and many variations and modifications may be made thereto without departing from the spirit and scope of the invention as defined in the appended claims.

We claim:

1. A method of separating components from a liquid mixture by use of a cyclone separator, comprising maintaining at least one of the components of the mixture in a reservoir for adding to the mixture, determining the efficiency of cyclone separation of at least a first of the components from the mixture and upon determination that the efficiency has departed from a predetermined value adding to the incoming mixture to the separator a quantity of said at least one of the components from the reservoir to tend to cause the efficiency to be reverted to the predetermined value.

2. A method as claimed in claim 1 wherein said mixture is an oil-water mixture and said one component comprises oil.

3. A method as claimed in claim 2 wherein oil and water are present in said oil-water mixture as respective dispersed and continuous phases.

4. A method as claimed in claim 2 wherein water predominates in said mixture.

5. A method as claimed in claim 1 wherein said mixture is an oil-water mixture and said one component comprises water.

6. A method as claimed in claim 5 wherein oil and water are present in said oil-water mixture as respective continuous and dispersed phases.

7. A method as claimed in claim 1 wherein said one component is recovered from the mixture after separation thereof, for said adding.

8. A method as claimed in any one of claims 1 to 7 further comprising determining the efficiency of separation of a second of the components of said mixture and upon determination that the efficiency of separation of said second component has departed from a further predetermined value, adding to the incoming mixture to the separator a quantity of another of said components of said mixture, not being said one component, to tend to cause said further efficiency of separation of said second component to be reverted to said further predetermined value.

9. A method as claimed in claim 8 wherein said first and second components comprise said one component and said another component respectively.

10. A method as claimed in claim 8 wherein said first and second components comprise said another and said one component respectively.

11. A method as claimed in claim 1 wherein said one component is added when said efficiency departs in one sense from said predetermined value, the method further comprising adding to the incoming mixture in the separator another of said components under a condition that said efficiency has departed from said predetermined value in a sense opposite to said one sense.

12. A method as claimed in any claim 1 wherein said first component comprises said one component.

13. A method as claimed in claim 1 wherein said first component comprises one of the components of the mixture not being said one component.

14. Separating apparatus for separating oil and water components of a liquid mixture wherein one of the components is present in the form of a disperse phase in another component in the form of a continuous phase, said apparatus comprising a cyclone separator having inlet means for inletting a liquid mixture comprised of components to be separated and at least two outlets for outlet of respective components of said mixture which differ in density, means at at least one of said inlet means and outlets for determining the efficiency of cyclone separation of at least one of said liquid components from the liquid mixture, reservoir means for maintaining a supply of a quantity of one of said liquid components, and means for selectively mixing an amount of said one liquid component from said reservoir means to said mixture prior to said inletting to the separator to maintain a desired efficiency.

15. Apparatus as claimed in claim 14, including further reservoir means for supply of a quantity of another of said components and means for selectively mixing an amount of said another component from said further reservoir means to said mixture prior to said inletting to the separator.

16. Separating apparatus for separating oil-water components of a liquid mixture wherein one of the components is present in the form of a disperse phase in another component in the form of a continuous phase, such apparatus comprising a cyclone separator having inlet means for inletting a liquid mixture comprised of components to be separated and at least two outlets for outlet of respective components of said mixture which differ in density, means for supplying a quantity of one of said liquid components, means for selectively mixing an amount of said one liquid component from said supply means to said mixture prior to inletting to the separator; and control means adapted to effect said mixing of said one component to the mixture in a fashion tending to maintain constant the cyclone separating efficiency of at least a first of the components comprising the mixture.

17. Apparatus as claimed in claim 16 and including means at at least one of said inlet means and outlets for determining the efficiency of separation of at least one of said components from the liquid mixture, and the control means being responsive to the determining means to vary the amount of said one selectively mixed component.

18. Apparatus as claimed in claim 16 including further supply means for supply of a quantity of another of said components and means for selectively mixing an amount of said another component from said further supply means with said mixture prior to said inletting to the separator, wherein said control means is adapted to effect said mixing of said another component with the mixture in a fashion tending to maintain constant the separating efficiency of the components comprising the mixture.

19. In a separating system utilizing a hydrocyclone having inlet means and at least two outlets for separating oil and water components of a liquid mixture into component parts thereof wherein one of the components is present in the form of a dispersed phase in another component in the form of a continuous phase, means for monitoring and improving the operating efficiency of the hydrocyclone to maintain the separated components at a predetermined level of purity, which means comprises;

means for sensing at least one parameter of at least one of the components of the liquid mixture which sensed parameter is indicative of separation efficiency;

means for adding a component of the liquid mixture into the liquid mixture prior to separation of the mixture in the hydrocyclone;

reservoir means for providing a supply of the component to be added to the liquid mixture by said adding means; and control means responsive to the sensing means for operating said adding means.

20. The separating system of claim 19 whereby said reservoir means includes means for separately supplying each of the dispersed phase and the continuous phase and further wherein said adding means is operable to selectively add one or the other of said components to the liquid mixture.

21. The separating system of claim 19 wherein said sensing means includes means at one of the hydrocyclone outlets for detecting the presence of one component in another component.

22. The separating system of claim 19 wherein said added component is the dispersed phase component of the liquid mixture.

23. A method of separating oil and water components of a liquid mixture by use of a cyclone separator, comprising;

determining the efficiency of cyclone separation of at least a first of the components from the mixture;

providing a supply of at least one of the components of the mixture for adding to the mixture;

selectively mixing an amount of said at least one component, from the supply to the mixture prior to admission of the mixture to the separator; and controlling the selective mixing of an amount of said at least one component to the mixture in a fashion tending to maintain constant the separation efficiency of at least a first of the components comprising the mixture.

24. The method of claim 23 and further including supplying an amount of such one component from a supply recovered from the mixture after separation thereof, for adding to the mixture to maintain constant the separating efficiency.

* * * * *

UNITED STATES PATENT AND TRADEMARK OFFICE
CERTIFICATE OF CORRECTION

PATENT NO. : 5,055,202
DATED : October 8, 1991
INVENTOR(S) : Noel Carroll

It is certified that error appears in the above-identified patent and that said Letters Patent is hereby corrected as shown below:

Column 5, line 20, delete "1 to 7" and substitute --1--.

Signed and Sealed this

Twelfth Day of January, 1993

Attest:

DOUGLAS B. COMER

*Attesting Officer*     *Acting Commissioner of Patents and Trademarks*